Dec. 8, 1970 H. C. GLASS ET AL 3,546,670
READING APPARATUS INCLUDING MEANS FOR RE-SENSING
AN ITEM WHICH IS DIFFICULT TO RECOGNIZE
Filed March 15, 1966
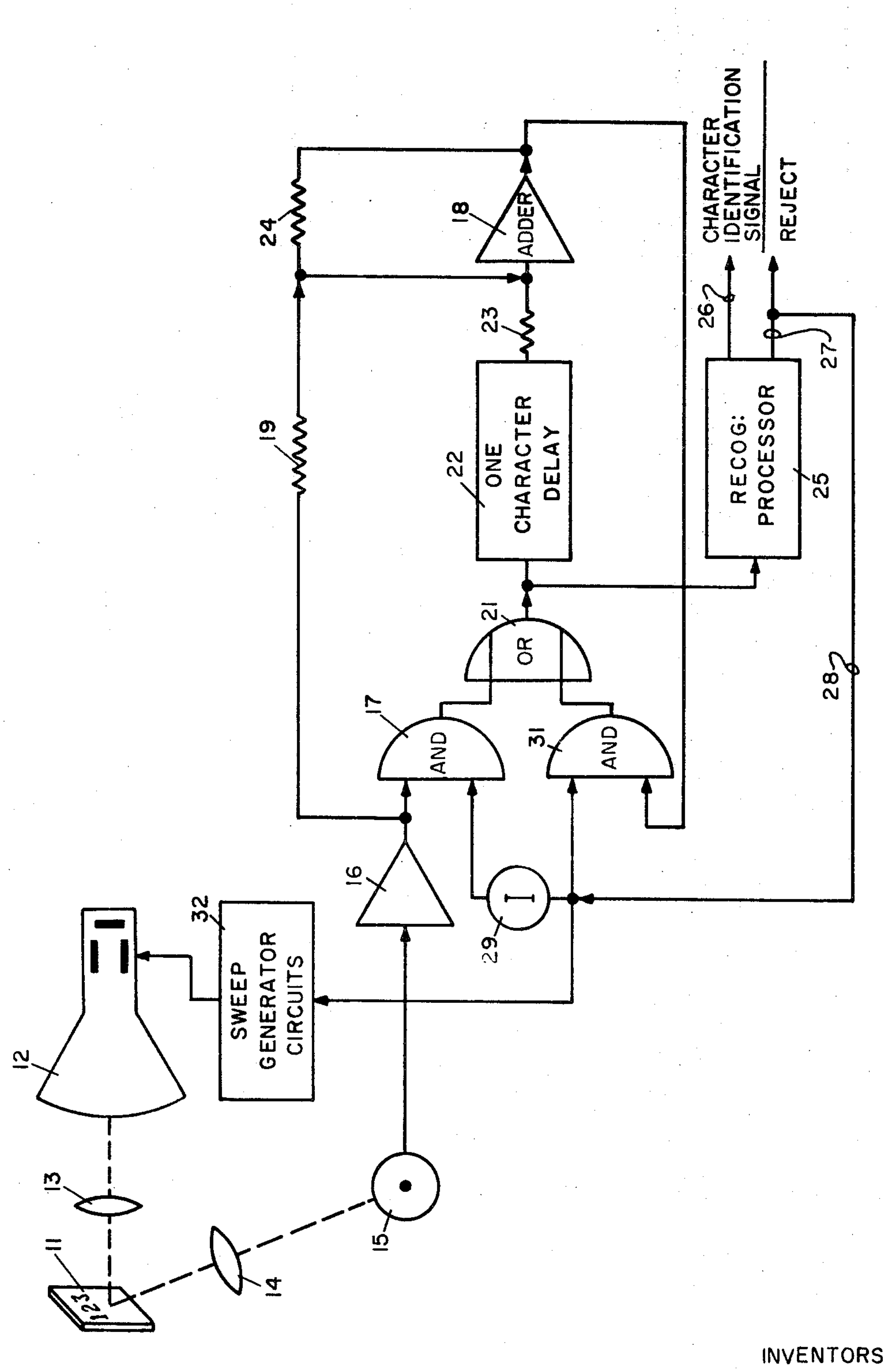
INVENTORS
VINSON C. ALWIN
HAROLD C. GLASS United States Patent Office 3,546,670

Patented Dec. 8, 1970

3,546,670

READING APPARATUS INCLUDING MEANS FOR RE-SENSING AN ITEM WHICH IS DIFFICULT TO RECOGNIZE

Harold C. Glass and Vinson C. Alwin, Fairfax, Va., assignors to Farrington Electronics, Incorporated, Springfield, Va., a corporation of Massachusetts Filed Mar. 15, 1966, Ser. No. 534,503
Int. Cl. G06r 9/00
U.S. Cl. 340—146.3 10 Claims

ABSTRACT OF THE DISCLOSURE

An automatic character reading device for reading characters at a fast rate. Each character is scanned a first time and upon non-recognition thereof it is rescanned. The signal resulting from the first scan of the character is stored and added to the first rescan thereof to thus increase the signal-to-noise ratio of the signal. Further, rescans are effected until recognition takes place.

The present invention relates in general to an automatic control system for electronic scanning equipment, and more particularly to apparatus for use in devices for automatically sensing perceptible images, characters or presentations, such as optical or magnetic automatic character sensing equipment and the like, which apparatus is controlled by the recognition or non-recognition of the item being scanned to increase the net processing rate of items, and improve the signal to noise ratio of the item when rescanning of the item is required.

The present invention is particularly applicable to the field of automatic character sensing and the ensuing description will be particularly applied to that field. Automatic character sensing equipment as employed in this field may briefly be described as apparatus which scan intelligence-bearing documents or the like containing items of information such as printed characters, sense the presence and/or absence of bits of each character thereon in reference to a time and/or positional base and relation and produce signals indicative of the presence and absence of such bits of characters within the scannnig field, interpret the signals thus produced to identify the character sensed, and produce an output at some desired time indicative of the character read. An example of such apparatus as disclosed in U.S. Pat. No. 2,897,481 of David H. Shepard for Apparatus for Reading.

In character recognition systems, the speed at which a character is scanned is determined by the most difficult character in a set or group of characters to be recognized, the worst degradation to be expected, and the noise level of the system. One of the dominant sources of noise in the system is the noise generated by the sensor which in optical character recognition equipment comprises photo-electric sensor such as a photomultiplier tube, which generated noise is added to the scanned signal resulting in a certain signal to noise ratio. This generated noise is essentially random in nature, therefore, its root-mean-square (RMS) amplitude is directly proportional to the square root of the electrical bandwidth, and since the bandwidth required is directly related to the scanning speed, the higher the scanning speed the wider the bandwidth, the greater the noise amplitude, and the lower the signal-to-noise ratio, assuming, of course, that the signal amplitude is constant. Thus, in the prior art, the limitation of the maximum scanning speed was that which would produce a usable signal-to-noise ratio on the worst combination of character configuration and degradation to be expected. As a result, the system operates at a lower speed than necessary for the vast majority of characters and conditions, spending more time than necessary on all but the most difficult characters.

Briefly, it is the general purpose of this invention to provide increased scanning speeds and efficiency in optical character recognition apparatus by avoiding some of the limitations encountered in the prior art as noted above. To attain this, the present invention provides a means of spending on each character (or group of characters) only as much time as necessary for correct identification, by utilizing a delay line or equivalent means to store the raw video signal representing at least one complete character. If the character cannot be identified in the processing section, it is immediately rescanned which new raw rescanned video signal is added to the video signal from the delay line to form a composite signal. The signal portion of the video representing the character will add directly, however, the random noise portion of the raw video produced by the photosensor will be unrelated in the two scans and will therefore add on an RMS basis, thereby the signal amplitude has been increased by a factor of two while the noise amplitude has been increased by only a factor of the square root of two resulting in an improvement in signal-to-noise ratio of $2/\sqrt{2}$ or $\sqrt{2}$. The composite signal again is fed to the processing section where the improved signal-to-noise ratio allows certain adjustments to be made in the processing technique which improve the likelihood of character identification. As the composite signal is being processed, it is simultaneously stored in the same storage means for possible further rescanning and processing.

An object of the present invention is the provision of apparatus for increasing the net speed in reading and recognizing signals produced from scanning intelligence-bearing items.

Another object of the present invention is the provision of novel methods and apparatus for facilitating the recognition of signals produced from rescanning intelligence-bearing items by increasing the signal-to-noise ratio.

A further object of the present invention is the provision of apparatus for rescanning a character only when the character is not recognized during a previous scan, and providing during the rescanning an enhancement of the previous signal-to-noise ratio detected during the previous scan.

Other objects, advantages and capabilities of the present invention will become apparent from the following detail description in conjunction with the accompanying drawing, showing only a preferred embodiment of the invention.

The single figure represents a detailed schematic diagram of the present invention.

Referring to the figure, disclosing a preferred embodiment of the instant invention, a document bearing characters to be read by the apparatus is scanned by a cathode ray tube 12 made to provide a vertical linear sweep horizontally across the document by relative movement between the document and the vertical linear sweep, focusing a bright spot on the document during the sweep via optical system 13. The bright spot imaged on the document 11 is reflected from the surface of the document through a suitable lens 14 onto photoelectric cell 15, except when light focused by the optical system 13 on the document falls upon a portion of the character, the output raw video signal of photoelectric cell 15, being passed through a conventional video amplifier 16.

The cathode ray tube 12 employed in the scanning unit of the present invention is of the conventional type supplied with pairs of vertical and horizontal deflection plates from conventional vertical and horizontal sweep generator circuits 32 in preselected time relation to produce a plurality of horizontal scanning lines resembling the scanning routine used in commercial television, such as is shown in U.S. Pat. No. 2,897,481 heretofore referred to.

The raw video signal from amplifier 16 is connected to one input of AND gate 17 and to the input of summing amplifier 18 by way of summing resistor 19. The output of AND gate 17 is connected to an OR gate 21, thence through a one character delay line unit 22 (or equivalent storage means) and summing resistor 23 to the summing amplifier 18 having a feedback network through feedback resistor 24. The one character delay line unit could be one of any number of devices used for temporary storage such as: magnetostrictive delay lines, quartz delay lines, magnetic drums, magnetic discs, etc. The output of OR gate 21 is also connected to a recognition processor unit 25 which quantizes the raw video signal, identifies the selected intracharacter relationships and produces on wire 26 output signals indicative of the character read; however, in some circumstances a character will not be recognized and a reject or non-recognition signal will be generated on wire 27.

The wire 27 is connected back through wire 28 and a conventional inverter unit 29 to another input of AND gate 17. The wire 28 is also connected to an AND gate 31 and back to the sweep generator circuits 32, the output of AND gate 31 being tied to an input of OR gate 21.

In operation, as a character is scanned by use of cathode ray tube 12 and photoelectric cell 15, the video signal received by the photoelectric cell passes through video amplifier 16, AND gate 17 and OR gate 21 to be processed in the recognition processor 25 to determine the identity of the character, and simultaneously the raw video signal is stored in the one-character delay line means 22. If the character cannot be identified a signal on wire 27 fed to the sweep generator circuits 32 will initiate rescanning, by CRT 12, of the non-identifiable character and simultaneously disable AND gate 17 by way of inverter 29; thus as the character is being rescanned the raw video signal from amplifier 16 is routed via summing resistor 19 to the summing amplifier 18 to add to it the raw video signal from the one-character delay line unit 22 which latter signal was produced and stored during the previous scan. In the instant embodiment synchronization of each of the two scans as they enter the summing amplifier 18, would be achieved by synchronizing the clock pulse counter unit used to trigger the horizontal and vertical sweep generators 32 with the one-character delay line.

As previously explained, the signal portion of the raw video signal, which was produced by the various strokes of the character will be identical in the two scans and will add directly, however, the random noise portion of the video, produced by the photoelectric cell, will be unrelated in the two scans and will therefore add on an RMS basis. Thus, in adding the video from the two scans in the summing amplifier, the signal amplitude has been increased by a factor of 2 while the noise amplitude has only been increased by a factor of the $\sqrt{2}$. This results in an improvement of signal-to-noise ratio of $2/\sqrt{2}$ or $\sqrt{2}$. The composite signal from summing amplifier 18 is then routed through AND gate 31 which is enabled from the signal on wire 27, thence the composite signal is routed through OR gate 21 and simultaneously fed to each of the one-character delay 22, and the recognition processor 25. In the recognition processor 25 the improved signal-to-noise ratio allows certain adjustments to be made in the processing technique which improves the likelihood of character identification. Should the character then be identified an output will be registered on wire 26 and the signal on wire 27 will go down to then disable AND gate 31, but enable AND gate 17 for routing new raw video signals appearing at the output of CRT 12.

If the character can still not be identified from the two-scan composite signal, the character is again rescanned and the raw video signal from amplifier 16 is routed via summing resistor 19 to summing amplifier 18 to be now added to the previous two-scan composite signal being emitted from the one-character delay line unit 22. Again the signal portion of the raw video signals adds directly while the random noise adds on an RMS basis. Thus, the signal will have been increased by a factor of 3 (with respect to the single scan video signal), while the noise will be only increased by a factor of $\sqrt{3}$, thereby the signal-to-noise ratio will be improved by a factor of $3/\sqrt{3}$ or the $\sqrt{3}$. Should it be necessary to repeat the rescanning and adding process for X consecutive times, the signal-to-noise ratio and be improved by the $\sqrt{X}$. Therefore, the character can be rescanned until it is identified or until it is logically decided that an improved signal-to-noise ratio will not yield identification and the character is finally rejected.

It may be seen that by rescanning and adding as shown above, the same net result is achieved if one scans more slowly with a reduced bandwidth. For example, suppose a character is scanned at a rate R, requiring a bandwidth W, and producing a signal-to-noise ratio $S/N$; and further suppose that the scanning rate for this character is made to be $R/3$, accordingly the bandwidth requirement would be $W/3$, then the resulting signal-to-noise ratio would be $\sqrt{3}\,S/N$, similar to that achieved in the instant invention when a three-scan composite signal is required to identify the particular character being scanned. The advantage of rescanning technique disclosed in the instant invention is therefore not to just achieve a lower signal-to-noise ratio by rescanning, but to increase the net processing rate of identifying characters by keying the effective scanning rate to the requirements of each character (or group of characters) on a character by character (or group of characters by group of characters) basis. In short the present invention increases the net processing rate by spending only as much time on each character as each character quality requires, or to improve the accept rate of a system with marginal signal-to-noise ratio, or both.

What is claimed is:

1. Apparatus for reading intelligence-bearing items comprising means for sensing an item to be read and producing a video signal characteristic of the item, said video signal including random noise, means for storing said video signal, recognition processing means responsive to said video signal and adapted to provide a non-recognition signal when the video signal corresponding to the item sensed cannot be identified, said sensing means being programmed to re-sense the item when said non-recognition signal occurs to produce a re-sensed signal, means for adding the re-sensed signal to the stored video signal to produce a composite video signal, the relative signal-to-noise ratio of which is enhanced by a factor of substantially $\sqrt{N}$ where N is the number of times the same item is sensed to improve the composite video signal for identification of the item.

2. The combination recited in claim 1 wherein said sensor means comprises a photoelectric sensor.

3. The combination recited in claim 2 wherein said storage means comprises a video delay line, and said adding means comprises a summing amplifier.

4. Apparatus for reading intelligence-bearing items comprising means for scanning the area of an item to be read, sensor means for producing a raw video scan signal characteristic of the item, said scan signal comprising random noise generated by the sensor, means for storing the signal of an item being read, recognition processing means adapted to provide a reject signal when the item sensed cannot be identified, said scanning means adapted to rescan the item when said reject signal occurs, means for adding the raw video rescan signal with the stored raw video signal to produce a composite signal having an enhanced relative signal-to-noise ratio by a factor of the $\sqrt{N}$ where N is the number of times the item has been scanned to improve the overall item signal for identification of the item, and means for simultaneously storing only the composite signal in said storage means during said rescan.

5. The combination according to claim 1 wherein said sensor means comprises a photoelectric cell.

6. The combination according to claim 5 including means to synchronize the adding of the stored item signal with the rescanned item signal.

7. The combination according to claim 5 wherein when the item cannot be identified from said composite signal a further rescan of the item is generated and said adding means produces a second composite signal comprising the further rescan and the first composite signal to enhance the relative signal-to-noise ratio improving the overall item signal for identification of the item.

8. The combination according to claim 5 wherein said adding means comprises a summing amplifier.

9. The combination according to claim 5 wherein said means for simultaneously storing only a composite signal in said storage means during the rescan comprises a first AND gate fed by said sensor means and an inverted output of said reject signal, the output of said first AND gate being connected to said storage means and the recognition processing means, a second AND gate fed by said reject signal and the output of said adding means, the output of said second AND gate being connected to the storage means and the recognition processing means.

10. A method in character recognition systems for increasing the net processing rate in identifying characters and improving the identification rate of a system with marginal signal-to-noise ratio where random noise is present, by keying the effective scanning rate to the requirements of each character scanned on a character by character basis comprising the steps of scanning the character to be read and generating a scan signal characteristic of the character scanned, storing the scanned signal, rescanning the character when not identified from the previous scan, adding the stored signal with the rescan signal to form a composite signal, storing only the composite signal during a rescan period, and additionally routing the composite signal to improve said signal-to-noise ratio to recognition processing logic.

References Cited

UNITED STATES PATENTS

| | | | |
|---|---|---|---|
| 2,897,351 | 7/1959 | Melton | 235—181 |
| 2,932,006 | 4/1960 | Glauberman | 340—146.3 |
| 3,091,763 | 5/1963 | Mortley et al. | 343—7.7 |
| 3,146,422 | 8/1964 | Greanias et al. | 340—146.3 |
| 3,201,705 | 8/1965 | Hanulec et al. | 343—17.1 |
| 3,267,467 | 8/1966 | Gerardin et al. | 343—7.7 |
| 3,307,185 | 2/1967 | Mefford | 343—17.1 |
| 3,388,377 | 6/1968 | Folson et al. | 340—146.1 |
| 3,280,253 | 10/1966 | McMaster et al. | 178—6.8 |

THOMAS A. ROBINSON, Primary Examiner

U.S. Cl. X.R.

178—6.8